(12) United States Patent
Penning et al.

(10) Patent No.: US 12,492,483 B2
(45) Date of Patent: Dec. 9, 2025

(54) METHOD FOR MANUFACTURING LAMINATED TINPLATE, A LAMINATED TINPLATE PRODUCED THEREBY AND USE THEREOF

(71) Applicant: TATA STEEL IJMUIDEN B.V., Velsen-Noord (NL)

(72) Inventors: Jan Paul Penning, The Hague (NL); Dmitry Kondratiuk, Haarlem (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 143 days.

(21) Appl. No.: 17/786,852

(22) PCT Filed: Dec. 18, 2020

(86) PCT No.: PCT/EP2020/087228
§ 371 (c)(1),
(2) Date: Jun. 17, 2022

(87) PCT Pub. No.: WO2021/123312
PCT Pub. Date: Jun. 24, 2021

(65) Prior Publication Data
US 2023/0023925 A1    Jan. 26, 2023

(30) Foreign Application Priority Data
Dec. 20, 2019  (EP) .................................. 19218809

(51) Int. Cl.
*C25D 5/48* (2006.01)
*B32B 15/085* (2006.01)
(Continued)

(52) U.S. Cl.
CPC ............ *C25D 5/505* (2013.01); *B32B 15/085* (2013.01); *B32B 15/09* (2013.01); *B32B 37/153* (2013.01); *C23C 22/78* (2013.01); *C25D 7/0614* (2013.01)

(58) Field of Classification Search
CPC ... C25D 5/34; C25D 5/48; C25D 5/50; C25D 5/505; C23C 28/00
(Continued)

(56) References Cited

U.S. PATENT DOCUMENTS 3,252,907 A * 5/1966  Kharouf .................... C23C 2/26
                                                        148/22
4,490,181 A * 12/1984  McCready ............... C23G 1/18
                                                        134/40
(Continued)

FOREIGN PATENT DOCUMENTS

DE    102017108403 A1 * 10/2018  ............. B32B 15/08
GB        1579760 A  * 11/1980  ............... C11D 7/12
(Continued)

OTHER PUBLICATIONS

Belkhaouda et al., "Corrosion and Passivation of Tinplate in Na2CO3 Medium: Effect of pH, Chloride and Carbonate Ions," Physical & Chemical News (2009), vol. 45, pp. 137-141. (Year: 2009).*
(Continued)

*Primary Examiner* — Edna Wong
(74) *Attorney, Agent, or Firm* — Vorys, Sater, Seymour and Pease LLP; Anthony P. Venturino; Maryellen Feehery Hank (57) ABSTRACT

A method for manufacturing a laminated tinplate for packaging applications, the laminated tinplate including a tinplate sheet and a thermoplastic laminate layer that covers at least one side of the tinplate steel sheet, to a laminated
(Continued)

tinplate produced thereby and use thereof in a process to produce containers for packaging purposes.

7 Claims, 8 Drawing Sheets

(51) Int. Cl.
  *B32B 15/09* (2006.01)
  *B32B 37/15* (2006.01)
  *C23C 22/78* (2006.01)
  *C23C 28/00* (2006.01)
  *C25D 5/50* (2006.01)
  *C25D 7/06* (2006.01)

(58) Field of Classification Search
  USPC ....... 205/137, 170, 196, 220, 224, 225, 154, 205/197
  See application file for complete search history.

(56) References Cited

U.S. PATENT DOCUMENTS

| | | | |
|---|---|---|---|
| 10,010,915 B2 | 7/2018 | Klein et al. | |
| 10,011,915 B2 | 7/2018 | Sundermeier et al. | |
| 2003/0129442 A1 | 7/2003 | Shigekuni et al. | |
| 2012/0222963 A1 | 9/2012 | Ishida et al. | |
| 2013/0029176 A1 | 1/2013 | Kadowaki et al. | |
| 2013/0299379 A1* | 11/2013 | Sundermeier | C25D 11/00 205/199 |
| 2015/0072167 A1* | 3/2015 | Stein-Fechner | B65D 25/14 428/623 |

FOREIGN PATENT DOCUMENTS

| | | | | | |
|---|---|---|---|---|---|
| JP | S596393 | A | | 1/1984 | |
| JP | 2003231989 | A | * | 8/2003 | ............. C23C 28/00 |
| JP | 2005029808 | A | * | 2/2005 | ........... C23C 28/021 |
| JP | 2014095121 | A | | 5/2014 | |
| KR | 2008058002 | A | * | 6/2008 | ............. C23C 22/82 |
| WO | WO-9318205 | A1 | * | 9/1993 | ............... C23G 1/20 |
| WO | 2012045791 | A1 | | 4/2012 | |
| WO | WO-2012146654 | A1 | * | 11/2012 | ............. B29C 48/05 |
| WO | WO-2014006031 | A1 | * | 1/2014 | ............. C23C 22/76 |
| WO | 2015001598 | A1 | | 1/2015 | |
| WO | WO-2017102143 | A1 | * | 6/2017 | ............. B32B 15/08 |
| WO | WO-2017174345 | A1 | * | 10/2017 | ............. B32B 15/08 |
| WO | WO-2019110616 | A1 | * | 6/2019 | ......... B29C 48/0022 |
| WO | WO-2020173953 | A1 | * | 9/2020 | ............. C25D 17/10 |

OTHER PUBLICATIONS

Written Opinion and International Search Report for corresponding PCT Application No. PCT/EP2020/087228 mailed Mar. 10, 2021.
Machine translation of JP2003231989A (Toyo Kohan Co Ltd) from Espacenet, URL:<https://worldwide.espacenet.com/>, retrieved from the Internet Feb. 4, 2024.
ArcelorMittal, Data sheet: C2.2, Tinplate: DWI, DWI electrolytically coated tinplate, Arcelor Mital South Africa (dated 2005), URL:<https://flatsteel.arcelormittalsa.com/fspcatalogue/DataSheets/Coated/Web_datasheet_c2.2.pdf>, retrieved from the Internet Nov. 14, 2024.
ArcelorMittal, Steel for Packaging Product Catalogue, URL:<https://packaging.arcelormittal.com/repository2/Unassigned/ArcelorMittal%20Packaging%20-%20product%20catalogue.pdf>, retrieved from the Internet Nov. 14, 2024.
Superficial Treatments the Coated Materials, Data Informacion Technica, Mundolatas.com, URL:<https://mundolatas.com/en/superficial-treatments-the-coated-materials/>, retrieved from the Internet Nov. 13, 2024.
Sodium Metasilicate, Kraft Chemical, URL: <https://www.kraftchemical.com/product/sodium-metasilicate/>, retrieved from the Internet Nov. 13, 2024.
Sodium metasilicate, Wikipedia, URL: <https://en.wikipedia.org/wiki/Sodium_metasilicate>, retrieved from the Internet Nov. 13, 2024.

* cited by examiner

METHOD FOR MANUFACTURING LAMINATED TINPLATE, A LAMINATED TINPLATE PRODUCED THEREBY AND USE THEREOF

FIELD OF THE INVENTION

This invention relates to a method for manufacturing a laminated tinplate for packaging applications, the laminated tinplate comprising a tinplate sheet and a thermoplastic laminate layer that covers at least one side of the tinplate steel sheet, to a laminated tinplate produced thereby and use thereof in a process to produce containers for packaging purposes.

BACKGROUND OF THE INVENTION

Tin mill products traditionally include (electrolytic) tinplate, electrolytic chromium coated steel (also referred to as tin free steel or TFS), and blackplate. Although not limited by it, most applications for tin mill products are used by the container industry in the manufacturing of cans, ends and closures for the food and beverage industry.

In the packaging industry the use of polymer-coated substrates is becoming more and more common in the production of cans and can components. The polymer-coated substrate can be produced by extruding a molten polymer film directly onto the metallic substrate or by producing a thermoplastic polymer film that is subsequently laminated, as a solid film, onto a metallic substrate in an integrated or separate lamination process step. Thermoplastic polymers most suitable for this process are polyesters, such as PET, and polyolefins, such as PE or PP.

The metallic substrate material used in polymer-coated packaging steels is mostly Electrolytic Chromium Coated Steel (ECCS), sometimes also referred to as Tin-free Steel (TFS), which is a cold-rolled steel electrochemically coated with a very thin layer of chromium and chromiumoxide. The chromium/chromiumoxide layer that is formed on top of the steel surface in this electrolytic process provides an excellent surface layer to attach an organic coating, like a thermoplastic polymer coating. Thus, polymer-coated packaging steel based on ECCS substrate exhibits excellent adhesion and can forming properties. Similarly, in a more recent development described as Trivalent Chromium Coated Steel (TCCT®), a very thin layer of chromium and chromiumoxide is applied electrochemically on top of cold-rolled steel, providing a polymer-coated steel with excellent properties.

However, the use of chromium-coated steel in packaging applications has some disadvantages such as lack of weldability and poor corrosion resistance in certain media, especially acidic (food) media. Tinplate, which is a steel substrate provided with a tin layer on either side, is both corrosion resistant and weldable, and thus represent a proper alternative substrate material where these properties are of importance. Although the adhesion between a polymer coating and a tinplate surface is not as good as the adhesion between a polymer coating and a chromium/chromiumoxide surface, still a high level of adhesion levels can be achieved and products with good canmaking properties can be obtained.

Tinplate is a light gauge steel strip coated with tin on both surfaces. The tin is usually applied by electrodeposition. Tinplate may be provided with the same thickness of tin on both sides, or with different thickness (differential coating). The tinplate may be used as produced, or it may be subjected to a heat treatment above the melting temperature of tin, the so-called flow-melting, e.g. by induction or resistance heating, to enhance the corrosion resistance of the product by formation of an inert $FeSn_2$-alloy layer at the interface between the steel substrate and the tin layer. A specific type of heat-treated tinplate is provided with an FeSn (50 at. % iron and 50 at. % tin) alloy layer as disclosed in WO2012045791-A1. This is produced by diffusion annealing tinplate containing at most 1000 mg/m2 and preferably between at least 100 and/or at most 600 mg/m2 of deposited tin at a temperature of at between 513° C. and 625° C. in a reducing atmosphere, at which temperature the tin layer is converted into an iron-tin alloy that consists of FeSn in a 1:1 ratio Fe:Sn. The FeSn layer may be coated with a further tin layer. This allows the total amount of tin to be lowered, despite the presence of depositing two tin layers.

An important aspect of the tinplate surface is that is not very stable towards tin oxide growth, and therefore needs to be passivated. If the tinplate surface is not passivated, a layer of oxide may form on its surface, and this layer will continue to grow in thickness during storage depending on the storage conditions. The tin oxide layer gives the product a yellowish appearance and will lead to loss of adhesion once an organic coating, such as a lacquer or a polymer coating, is applied to the surface. For many years, the most common passivation treatments for tinplate have been based on the use of chromate solutions, i.e. solutions containing hexavalent chromium, to which the freshly tinned steel strip is exposed using a dip or electrolytically assisted process (type '300' and '311' passivation treatments, respectively). However, hexavalent chromium is nowadays considered a hazardous substance that is potentially harmful to the environment and constitutes a risk in terms of worker safety.

Objectives of the Invention

It is an object of the present invention to provide a method of manufacturing a laminated tinplate.

It is a further object to provide a method for manufacturing a laminated tinplate that does not involve hexavalent chromium technology.

It is still a further object to provide a method for manufacturing a laminated tinplate that does not employ hexavalent chromium, is weldable and has excellent adhesion between the laminate layer and the tinplate.

It is also an object to provide a laminated tinplate produced without hexavalent chromium technology that is weldable and has excellent adhesion between the laminate layer and the tinplate, and which is suitable for making metal cans and metal can components.

DESCRIPTION OF THE INVENTION

One or more of the objects is reached with the method for manufacturing a laminated tinplate for packaging applications, the laminated tinplate comprising a tinplate sheet and a thermoplastic laminate layer that covers at least one side of the tinplate sheet, the laminate layer consisting of a single layer or a plurality of layers wherein each layer contains a thermoplastic aromatic (co) polyester or blend thereof or a polyolefine comprising at least 90% by mole of a propylene unit, the method comprising the subsequent steps of:
  producing a tinplate sheet by providing a cold-rolled steel sheet with a tin layer on one or both sides by means of electroplating;
  optionally heat treating the tinplate sheet by annealing above the melting temperature of tin;
  optionally providing the heat-treated tinplate sheet with a further tin layer on one or both sides by means of electroplating;
  subjecting the tinplate sheet to a surface treatment by dipping the tinplate sheet in an aqueous solution having a pH of from 8 to 12 comprising phosphate, borate, sulphate or carbonate ions or a combination thereof;
  rinsing and drying the tinplate sheet;
  optionally applying a chromium-free, no-rinse, dry-in-place passivation treatment solution to the tinplate sheet;
  drying of the passivated tinplate sheet;
  optionally coiling the tinplate sheet for storage or transport and uncoiling for further processing;
  providing the thermoplastic laminate layer for coating onto at least one side of the tinplate sheet;
  pre-heating the tinplate sheet and laminating the thermoplastic laminate layer onto the pre-heated tinplate sheet to produce the laminated tinplate;
  post-heating the laminated tinplate to a temperature sufficiently high to melt the laminate layer;
  cooling the post-heated laminated tinplate.

Figure 9:
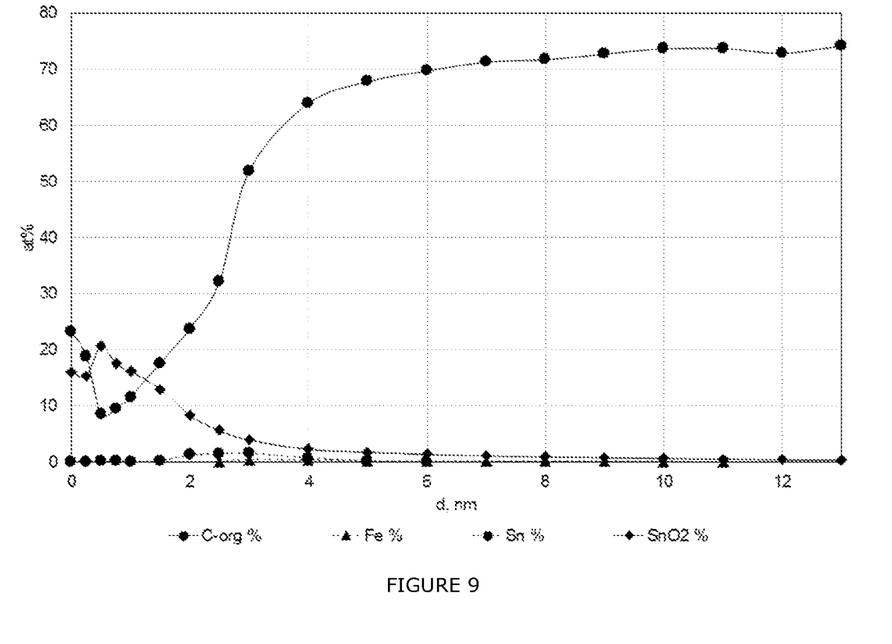

In the context of this invention tinplate is defined as the steel substrate including the tin layer, the laminate layer is the polymer coating layer that is to be laminated onto the tinplate, and the tinplate with the laminate layer laminated onto the tinplate is referred to as the laminated tinplate (see FIG. 9a-c).

The method according to the invention provides a method to provide a tinplate sheet, which may be provided in the form of a strip of tinplate, and provide it with a laminate layer. The surface condition of the tinplate is critical in the adhesion of the laminate layer and the method of according to the invention ensures that the surface of the tinplate is suitable to be heat-bonded with a laminate layer. The way the surface of the tinplate is made suitable is by dipping the tinplate in an aqueous solution, which may be a buffered solution, or by imposing a cathodic current onto the tinplate while being dipped, and optionally by additionally applying a chromium-free, no-rinse, dry-in-place passivation treatment solution to the tinplate sheet. This results in a clean and susceptible surface from which any contaminants and tin oxides have been removed to such an extent that the adhesion after heat bonding is of the same quality as the adhesion of the prior art tinplate that has been passivated with a hexavalent chromium treatment. In case the storage conditions of the tinplate are such that substantially no tin oxide growth takes place, the surface treatment by dipping the tinplate sheet in the aqueous solution having a pH of from 8 to 12 comprising phosphate, borate, sulphate or carbonate ions, or a combination thereof, with the optional simultaneous application of a cathodic current onto the tinplate may be sufficient and the additional application of the chromium-free, no-rinse, dry-in-place passivation treatment solution may not be needed.

Preferably the pH of the aqueous solution is not lower than 8.5 and/or not higher than 11.5. A suitable maximum pH value is 11 or even 10.5. The aqueous solution preferably contains cations from Group 1 (e.g. $Na^+$, $K^+$) or Group 2 (e.g. $Mg^{2+}$, $Ca^{2+}$) from the Periodic Table or polyatomic cations (e.g. $NH4^+$), and polyatomic anions (phosphates, borates, sulphates, carbonates and the like). Also, the anion may be the conjugate base of an organic acid (e.g. acetates, citrates). Furthermore, the electrolyte may contain other chemical additives, such as surfactants, wetting agents, anti-foaming agents etc. to support the electrochemical treatment.

Preferably the aqueous solution contains as the anion only carbonates, preferably added to the aqueous solution as sodium carbonate, and preferably no borates, phosphates, sulphates or the like. By means of a non-limiting example a sodium carbonate decahydrate solution, containing not more than 1 g/l $Na_2CO_3 \cdot 10H_2O$ in deionised water with a pH of between 9.5 and 10 is suggested.

However, in case these storage conditions of the tinplate are expected to be less favourable because of humidity, storage temperature, storage duration, etc., the surface of the tinplate sheet can be passivated by additionally applying a chromium-free, no-rinse, dry-in-place passivation treatment solution to the tinplate sheet, and not by electrolytic deposition.

The passivation treatment solution may be based on zirconium, titanium, a combination of zirconium and titanium, phosphates, such as an acidic aqueous composition containing water-soluble inorganic compounds of the elements Zr, Ti, Hf as disclosed in U.S. Pat. No. 10,011,915. Examples are Bonderite® M-NT1455, Bonderite M-NT1456 and Bonderite M-NT10456 (by Henkel). or Primecoat® Z801 (by AD Chemicals). The passivation treatment solution is not a silane or siloxane based solution as these do not improve the adhesion between the tinplate and the thermoplastic laminate layer in the context of this invention. So according to the invention the passivation treatment solution is silane free, siloxane free and not Si-based.

Advantages of a no-rinse, dry-in-place system over an electrolytic system is that the solutions are simple to apply, use simple equipment in compact application units, allowing easy fitting on existing lines and more versatile chemistries are available. The passivation treatment solution can be applied to the surface treated tinplate surface by application techniques that are common for such passivation systems. Suitable application techniques include: dipping, dipping with squeegee rolls, rotor-spray application, rotor-spray application supported by the use of a smoothing roll, spray application, spray-squeegee application, application by means of a roll coater systems, application by slot coating, slot curtain coating, etc.

The surface treated and optionally passivated tinplate can be coiled for storage and transport and later uncoiled, or it can be immediately transferred to a lamination unit where a laminate layer is laminated in-line onto a pre-heated tinplate.

The invention is also embodied in a method a wherein the thermoplastic laminate layer is provided by:
  providing a pre-produced mono-axially or bi-axially oriented thermoplastic laminate layer,
or by
  melting thermoplastic polymer granules in one or more extruders to form the one or more layers and forming the thermoplastic laminate layer consisting of the one or more layers by passing the molten polymer or polymers through a flat (co-)extrusion die and/or two or more calendering rolls;
followed by:

A.
- cooling the thermoplastic laminate layer to form a solid thermoplastic laminate layer;
- optionally trimming the edges of the thermoplastic laminate layer;
- reducing the thickness of the solid thermoplastic laminate layer by stretching the solid thermoplastic laminate layer in a stretching unit by exerting a stretching force only in the longitudinal direction;
- optionally trimming the edges of the stretched thermoplastic laminate layer;
- laminating of the laminate layer onto the pre-heated tinplate sheet;

or followed by

B.
- drawing the extruded thermoplastic laminate layer between the flat (co-)extrusion die and a cast roll, and cast at its final desired thickness on the cast roll to rapidly cool the drawn thermoplastic layer wherein the cast&cooled thermoplastic laminate layer is essentially non-oriented;
- optionally trimming the edges of the cast&cooled thermoplastic laminate layer;
- in-line laminating the cast&cooled thermoplastic laminate layer onto the pre-heated tinplate sheet.

The application process of the laminate layer to the tinplate is preferably performed by means of extrusion coating and lamination, wherein a polymer is melted and formed into a thin hot film in a flat (co-)extrusion die, wherein the extruded polymer film is subsequently led onto a cast or cooling roll and then laminated onto the pre-heated tinplate substrate to form the laminated tinplate. The laminated tinplate then usually passes through a roll-nip assembly, which presses the laminate layer firmly onto the substrate to ensure complete contact and adhesion. The pre-heat temperature of the tinplate has to be sufficiently high to promote adhesion of the laminate layer to the tinplate, but not so high as to cause sticking of the laminate layer to the installation or to cause degradation of the laminate layer. The optimal pre-heat temperature therefore depends on the combination of the laminate layer and the lamination apparatus.

The alternative for extrusion coating and lamination is film lamination, where a solid laminate layer is supplied and coated onto a heated tinplate and pressed onto the tinplate by a roll-nip assembly to ensure complete contact and adhesion of the laminate layer to the pre-heated tinplate. This solid laminate layer may be pre-produced and even bought from an external supplier, or it may be produced on-site and subsequently laminated onto a tinplate sheet.

In both cases, after laminating the laminate layer onto the tinplate in the roll-nip assembly, the laminated tinplate is post-heated in a post-heat device to a temperature above the melting point of the laminate layer or layers, or if the laminate layer consists of different polymers, to a temperature above the melting point of that laminate layer in the multilayer system that has the highest melting temperature. The aim of the post-heat is to reduce or eliminate any residual orientation in the laminate layer.

After this post-heat the laminated tinplate is immediately cooled at a sufficiently high cooling rate and to a temperature which is sufficiently low to suppress crystallisation as much as possible, preferably to completely suppress crystallisation. A water quench is adequate and often used. For most polyesters a quench temperature of below 50° C. is a good guideline. Below the glass temperature (Tg) the polymer chains are no longer mobile. A value of 50° C. is below the glass temperature of most aromatic (co) polyesters. Polyolefins have a much lower Tg, even below 0° C., so here the issue is to suppress crystallisation as much as possible and in particular avoid the growth of large (spherulitic) crystals. The cooling rate achieved in such a quench is not particularly critical, as long as it is fast enough, and a suitable values lies between about 50 to 300° C./s, e.g. about 100° C./s. The required pre-heat and post-heat temperature and the cooling rate and cooling temperature depends on the type of polymer used and can be easily determined on the basis of the above. The post-heat temperature is preferably at least 235° C.

As laminate layer the invention can use pre-produced biaxially or monoaxially oriented polymer films, in-line cast and stretched monoaxially oriented polymer films, or in-line cast and drawn unstretched polymer films.

The polyester in the laminate layer is a thermoplastic aromatic (co) polyester or blend thereof. In particular reference is made in relation hereto to polyethylene terephthalate (PET), IPA-modified polyethylene terephthalate (IPA-PET), CHDM-modified polyethylene terephthalate (PETg), polybutylene terephthalate (PBT), polyethylene naphthalate (PEN), or copolymers or blends thereof.

The polypropylene in the laminate layer is selected from the group of polypropylenes, polypropylene copolymers, chemically modified polyolefins such as maleic anhydride grafted polypropylene. The latter is used mainly as an adhesion layer. Polypropylene is used mainly as a bulk layer.

In the context of this invention "in-line" is to be understood as constituting an integral part of a continuous sequence of operations. Consequently, in an in-line production of the laminate layer and the laminated tinplate the production of the laminate layers and the coating of the laminate layers onto the pre-heated tinplate is performed in a continuous and uninterrupted sequence of operations.

The invention is also embodied in the laminated tinplate wherein the laminate layer is formed at least on the side that becomes the inside of a packaging, such as a container or can, and the polyester in one or more of the layers in the laminate layer contains at least 80 mol. %, and preferably 85 mol. % of an ethylene terephthalate unit or wherein the polyester is a co-polyester comprising at most 35 mol. % of CHDM or 20 mol. % of IPA.

The invention is also embodied in the laminated tinplate wherein the laminate layer is formed at least on the side that becomes the inside of a packaging, such as a container or can, and the polyester in one or more of the layers in the laminate layer contains at least 80 mol. %, and preferably 85 mol. % of a butylene terephthalate unit.

The invention is also embodied in the laminated tinplate wherein the laminate layer is formed at least on the side that becomes the inside of a packaging, such as a container or can, and the polyester in one or more of the laminate layer contains a blend of a polyester containing 85% by mole of an ethylene terephthalate unit and a polyester containing at least 85% by mole of a butylene terephthalate unit.

The invention is also embodied in the laminated tinplate wherein the laminate layer or layers on at least one of the sides of a packaging such as a container or can, comprises one or more polypropylene layers consisting essentially of polypropylene.

The invention is also embodied in the laminated tinplate wherein the laminate layer or layers comprises an adhesion layer consisting of a maleic anhydride grafted polypropylene.

In another embodiment of the invention the laminated tinplate is subjected to a stretching operation wherein the stretching operation is achieved by:
- passing the material through a temper mill and applying a thickness reduction between 0-3%, preferably of at least 0.2%; or by
- passing the material through a stretcher-leveller.

To achieve intimate bonding between the laminate layer and the tinplate it is necessary to utilise elevated temperatures and/or heat treatments such as the pre-heating of the substrate and the postheating of the laminated tinplate. These heat treatments can negatively impact the bulk mechanical properties of the steel substrate, due to ageing effects. By stretching the polymer-coated steel substrate to a small extent (i.e. between 0-3%, preferably at least 0.2%, more preferably at least 0.5%) through temper rolling or passing the material through a stretcher-leveller. Such a treatment improves the bulk mechanical, may improve the strip shape and such a material conditioning process can also potentially be used to modify the surface structure. The inventors found that the development of stress cracking in polymer-coated steel substrates for packaging applications is directly related to the mechanical behaviour of the substrate. There is a strong correlation between the occurrence of stress racking and the areas where the substrate shows inhomogeneous, localised deformation due to discontinuous yield phenomena (Lüders' lines). By temper rolling or stretcher-levelling the polymer-coated substrate these discontinuous yield phenomena are suppressed.

The invention is also embodied in the method wherein the laminate layer on the one or both sides of the passivated tinplate sheet is a multi-layer coating system, said coating system comprising at least an adhesion layer for adhering to the passivated tinplate sheet, a surface layer and a bulk layer between the adhesion layer and the surface layer.

The method according to the invention involving the production of in-line casting and drawing of unstretched polymer films is eminently suitable for producing laminated tinplate for 3-piece can bodies as described in WO2019110616-A1.

The invention is also embodied in a preferable embodiment wherein the cast&cooled thermoplastic laminate layer is slit in the longitudinal direction into at least N wide laminate layers (9a-9d), where N is at least 2 and (N-1) narrow strips (10a-10c) using slitting means (11), followed by leading the narrow strips away from the wide laminate layers by discharging means (12) and subsequently coating the wide laminate layers onto the pre-heated tinplate by means of a nip-roll assembly (4a,4b) to obtain a laminated tinplate with a plurality of wide laminate layers (9a-9d) separated spatially in the longitudinal direction by narrow strips (10a-10c) free from said wide laminate layer and wherein the edges of the tinplate remain free from said wide laminate layer, followed by the post-heating of the laminated tinplate and the cooling of the post-heated laminated tinplate.

This embodiment results in a laminated tinplate coated with narrow strips of thermoplastic laminate layer produced from a single wider thermoplastic laminate layer that was produced by in-line extrusion. Between the narrow strips there is a very narrow strip of unlaminated tinplate, and the laminated tinplate produced thusly is particularly suitable for producing blanks for 3-piece can bodies.

In an embodiment the laminate layer has a thickness of between 5 and 35 μm.

In the method according to the invention the laminate layer is defined in terms of its major polymer constituent. However, in addition to the polymer constituents additives such as anti-oxidant, heat stabiliser, UV absorbent, plasticiser, pigment, nucleating agent, antistatic agent, release agent, anti-blocking agent, etc. may be present in the polymer.

Co-polyesters are produced when more than one diacid or diol is used in the polymerisation process. When ethylene glycol (EG) and up to 35% cyclohexanedimethanol (CHDM) are used together a co-polyester called glycol modified polyethylene terephthalate (PETg) is produced. When up to 20 mol. % of the terephthalic acid is replaced by isophthalic acid (IPA), the result is the IPA-PET co-polyester.

Preferably the steel used for the tinplate steel substrate is a carbon steel, preferably a low carbon steel, extra-low carbon steel, ultra-low-carbon steel or a HSLA-steel. The thickness of the steel substrate is usually between 0.10 and 0.49 mm. These unalloyed (ULC, LC and ELC) or microalloyed (HSLA) steels are relatively cheap substrates and provide good strength and formability. The steels are produced by means of commonly known processes such as casting, hot-rolling and cold-rolling. Low carbon steels typically comprise 0.05 to 0.15 wt. % C and extra low carbon steels typically comprise 0.02 to 0.05 wt. % C. Ultra Low Carbon steels comprise typically below 0.01 wt. % C. Other elements may be present in addition to carbon in accordance with EN 10020-2000 which prescribes how much of a certain element may be present to still be considered unalloyed steel.

The invention is also embodied in a laminated tinplate obtained by the process according to the invention, in the laminated tinplate for producing blanks for 3-piece cans, and in the use of the laminated tinplate according to the invention in a process to produce cans or can parts for packaging purposes.

Examples

The invention will now be explained by means of the following, non-limiting Examples.

A cold-rolled low carbon steel of thickness 0.17 mm and TH550 temper grade was electrolytically tinned on a commercial tinning line to give tinplate having a tin coating weight of 1.0, 2.0, 2.8 or 5.6 g/m$^2$ on the test side of the product. In most cases the tin layer was flow melted but in two cases (Examples 7 and 8) the flow melting unit was switched off to produce non flow melted tinplate. The as-produced tinplate was subsequently passivated in-line with the tinning process according to different methods as outlined below.

In Examples 1-6, which reflect the current state-of-the-art, the tinplate was passivated by passing the strip through a sodium dichromate solution under cathodic current, i.e. the traditional 'CDC' (cathodic dichromate) or '311' passivation treatment.

In Examples 7-10, a chromium-free passivation was applied by first passing the strip through a sodium carbonate solution (characterised by a pH of 9.5-10) without applying a current. After rinsing and drying, a solution of Bonderite M-NT1456 was applied by means of a spray disc in combination with smoothing rolls. The concentration of the Bonderite solution corresponded to 0.25 g/l Ti and was applied at a wet film thickness of about 4 ml/m$^2$ aimed to give a dry passivation film thickness of 0.8-1.2 mg/m² Ti. The wet film was dried in place and the strip was subsequently coiled.

In Examples 11 and 12, the strip was passed through the sodium carbonate solution of Examples 7-10 without applying a current. After rinsing and drying, the strip was coiled without applying the Bonderite solution. If the time between the passing of the tinplate through the sodium carbonate solution and the lamination of the tinplate with a thermoplastic laminate layer is brief, then these examples show that without the application of a chromium-free passivation treatment solution to the tinplate good adhesion can be obtained.

In Examples 13 and 14, the strip was passed through the sodium carbonate solution of Examples 7-12 while applying an anodic current corresponding to a charge density of 40 C/m². After rinsing and drying, a solution of Bonderite M-NT1456 was applied by means of a spray disc in combination with smoothing rolls. The concentration of the Bonderite solution corresponded to 0.25 g/l Ti and was applied at a wet film thickness of about 4 ml/m² aimed to give a dry passivation film thickness of 0.8-1.2 mg/m² Ti. The wet film was dried in place and the strip was subsequently coiled.

To the various tinplate materials described above, a polyester coating was applied by means of the extrusion coating and laminating process. Two types of polymer coating were applied:

Coating type A consists of a monolayer of 15 µm in thickness consisting of poly(ethylene terephthalate) type N180, commercially available from Indorama (PET). Coating type B consist of an adhesion layer, contacting the metal substrate, of 3 µm in thickness and a top layer of 12 µm in thickness. The adhesion layer is a mixture consisting of 70% by weight of glycol-modified poly(ethylene terephthalate) (PETg), Eastar Copolyester 6763, commercially available from Eastman Chemical Company, and 30% by weight of poly(ethylene terephthalate) type N180. The top layer consists of poly(ethylene terephthalate) type N180 (PET).

In the polymer coating process, the tinplate was preheated to a temperature such that the tinplate temperature was at least 170° C. when the laminate layer was brought into contact with the tinplate. After applying the laminate layer, the laminated tinplate were briefly re-heated to a temperature of 275° C., subsequently quenched in a cold-water tank, dried, and coiled.

An overview of the different laminated tinplate in the present Examples is given in Table 1. Examples 1-6 reflect the current state-of-the-art, where the tinplate substrate is tinplate passivated with a hexavalent chromium passivation solution (311). Examples 7-12 are the inventive examples where the tinplate substrate is a chromium-free tinplate. Examples 13-14 are the comparative examples where the tinplate substrate is a chromium-free tinplate.

Evaluation of the Materials

Dry Adhesion by 180° T-Peel Test

A quantitative evaluation of coating adhesion was done by 180° T-peel tests performed on flat sheet material. For this test, 15 mm wide strips were cut from the polymer-coated material. The strip was placed with the narrow end in a small volume of 18% hydrochloric acid to etch the steel base and obtain a short length (a few mm) of free polymer coating. Adhesive tape was attached to the free coating, and the coating was subsequently peeled away from the substrate at a 180° angle using a tensile tester operated at 25 mm/min. The T-peel force is measured as the maximum load value (expressed in N/15 mm) required to start peeling off process.

Dry Adhesion by Cross-Cut Test

Coating adhesion on flat material was evaluated using a cross-cut test according to ISO 2409. A special cutting tool, consisting of 4 cutting blades spaced 5 mm apart, was used and the cross-cut was applied to a 15×7.5 cm flat panel using a laboratory scale, motor-driven cutting apparatus. After application of the cross-cut, coating adhesion is evaluated by peeling the coating using a piece of 25 mm wide, Scotch No. 610 adhesive tape, and expressing the result by the well-known Gitterschnitt (GT) scale ranging from 0 (no delamination) to 5 (total delamination). All tests are done in triplo.

Adhesion after Sterilisation in Various Media

Flat panels of 15×7.5 mm in size were placed in a test medium inside a CertoClav "pressure cooker" sterilisation apparatus, and the appropriate time and temperature conditions for sterilisation were then applied. The various media and test conditions are described in Table 2. After the sterilisation procedure, the panels were allowed to cool and dry, and adhesion was evaluated (within less than 4 hours) by the cross-cut test as described above.

XPS (X-Ray Photoelectronic Spectroscopy) Analysis of Delamination Interface

Surface and near surface chemical analysis of freshly delaminated samples was carried out by means of a Kratos Axis Ultra instrument, using Al monochromated source (1486.7 eV) at 15 kV acceleration voltage and 15 mA emission current. The subsurface composition of the freshly exposed surfaces was investigated by XPS depth profiling using Ar$^+$ sputtering. After each XPS measurement the sputtering cycle was done at 2 kV of acceleration voltage and 60 pA extraction current of 3×3 mm sputter area that delivers a sputtering speed of 1 nm/min. The analysis was performed on substrate and coating side of the freshly delaminated surfaces. Delamination was achieved by applying an epoxy resin (Betamate 1496) to a sample of polymer-coated metal followed by curing at about 175° C. for 20 min, and subsequently dipping the sample in liquid nitrogen, where relatively thick epoxy layer pulls the polymer coating off from the substrate due to epoxy shrinkage at low temperature. XPS analysis was performed at room temperature in ultra-high vacuum ($1 \times 10^{-9}$ mbar) to mitigate the effect of the atmosphere. The obtained XPS spectra per detected element were then processed using CasaXPS to produce concentrations (atomic %) of different species at different depth from the surface.

Evaluation of adhesion on polymer-coated tinplate by means of the cross-cut test is always done using at least three panels, and due to the nature of the test and interpretation of the result, there may be a small variation in the GT adhesion value between separate panels. Based on our experience we have established that adhesion of the polymer coating on tinplate substrates will be sufficient for final end-use applications as long as the highest GT adhesion value (i.e. poorest adhesion result) is not higher than 2 within the three tested panels. Furthermore, the dry T-peel adhesion value should be at least 5 N/15 mm in order to undergo forming steps without delamination of the coating.

Adhesion results from the present Examples are given in Table 4. Based on the above criteria, it is seen that the materials according to present state-of-the-art, using chromium passivation, all show good performance. For coating type A, dry T-peel adhesion values are in the range from 8 to 11 N/15 mm, while for coating type B the values are in the range from 6.5 to 8.5 N/15 mm. Furthermore, cross-cut adhesion values are all within the required range. The tin coating weight of the tinplate substrate does not appear to have any significant effect on the test results within the investigated range.

The Inventive Examples 7-12 also demonstrate excellent adhesion properties with dry T-peel adhesion values (coating Type B only) in the range from 7 to 9 N/15 mm and cross-cut adhesion values ranking 2 or lower in all cases. Interestingly, when no Bonderite passivation solution is applied after the cleaning step (Ex. 11 and 12), excellent adhesion is also achieved. It should be noted that in this case, which corresponds essentially to 'non-passivated' tinplate, a tin oxide layer may form on the outermost surface of the tinplate during the time elapsed between production of the tinplate material and coating with a polymer layer, and that this tin oxide layer could impair the adhesion of the polymer coating. So, when using this method, the time elapsed between production of the tinplate material and coating with a polymer layer, and the conditions of storage of the tinplate material (e.g. temperature, relative humidity) should be well controlled.

In the Comparative Examples 13-14, where the cleaning step is performed using an anodic current, very poor coating adhesion is observed. The dry T-peel adhesion values are very low (2.0 N/15 mm in Ex. 13) or difficult to measure (<0.5 N/15 mm in Ex. 14, where the coating almost spontaneously delaminated from the substrate), and this is similarly noticed in cross-cut adhesion values ranking 3 in many cases, and even up to 4 or 5 in the most aggressive media, i.e. media containing acetic acid.

Figure 4:
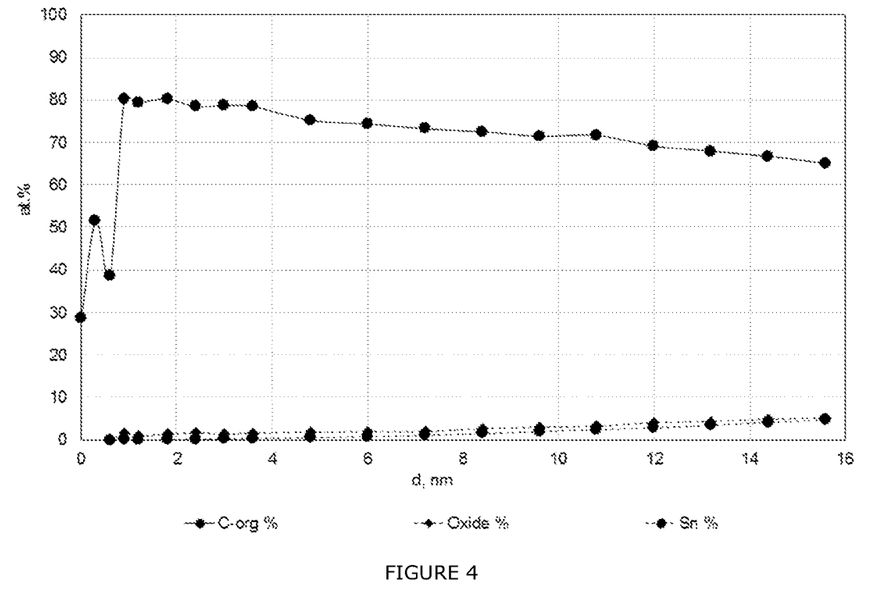
FIGS. 4 to 9 show XPS profiles of laminated tinplate after separation of the laminate layer from the tinplate to study the nature of the bond between the laminate layer and the tinplate.
Figure 5:
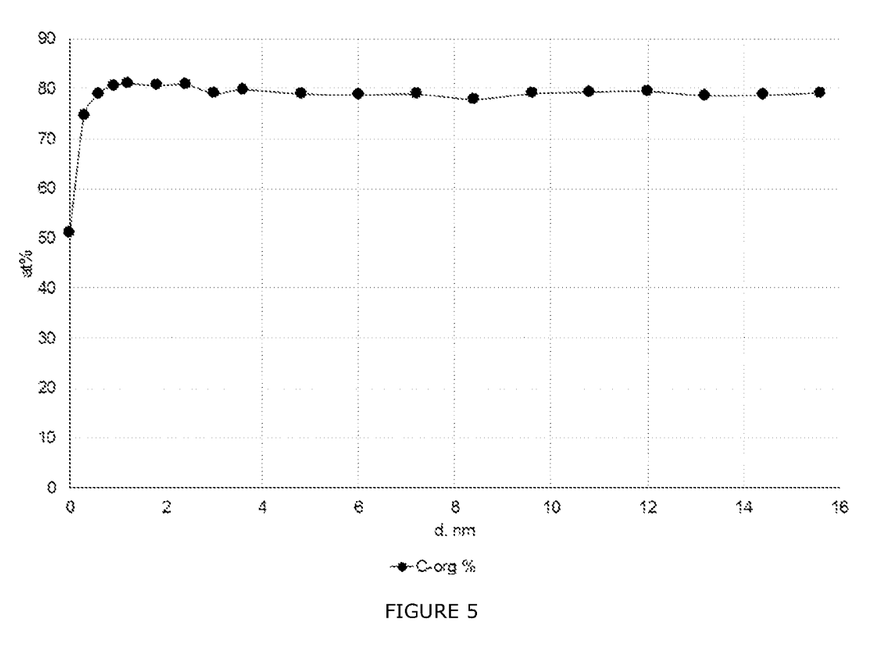
Figure 6:
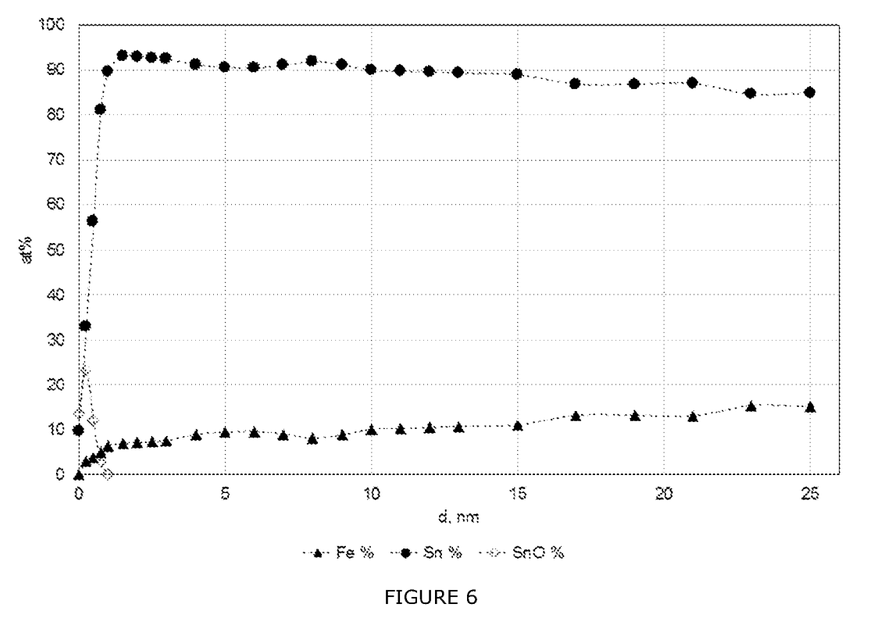
Figure 7:
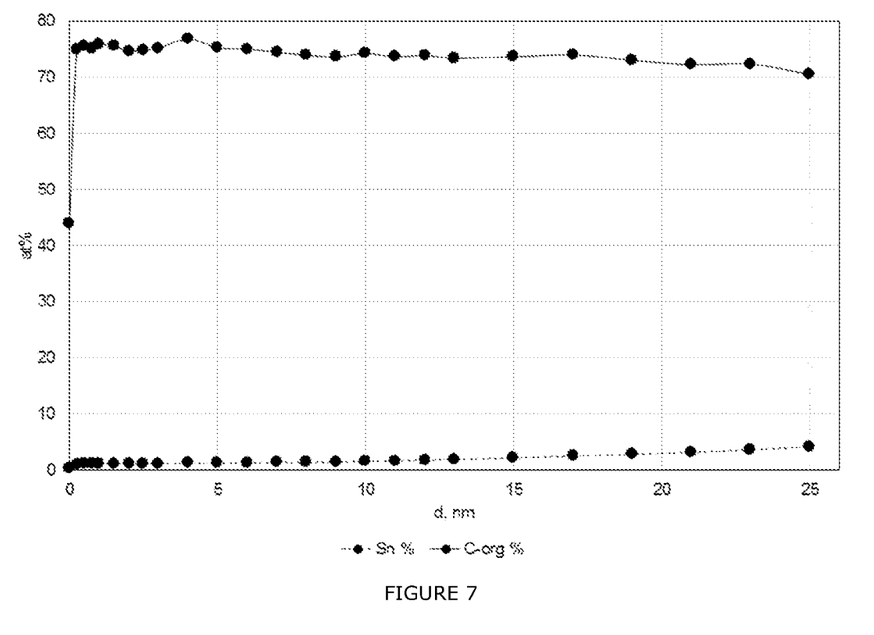
Figure 8:
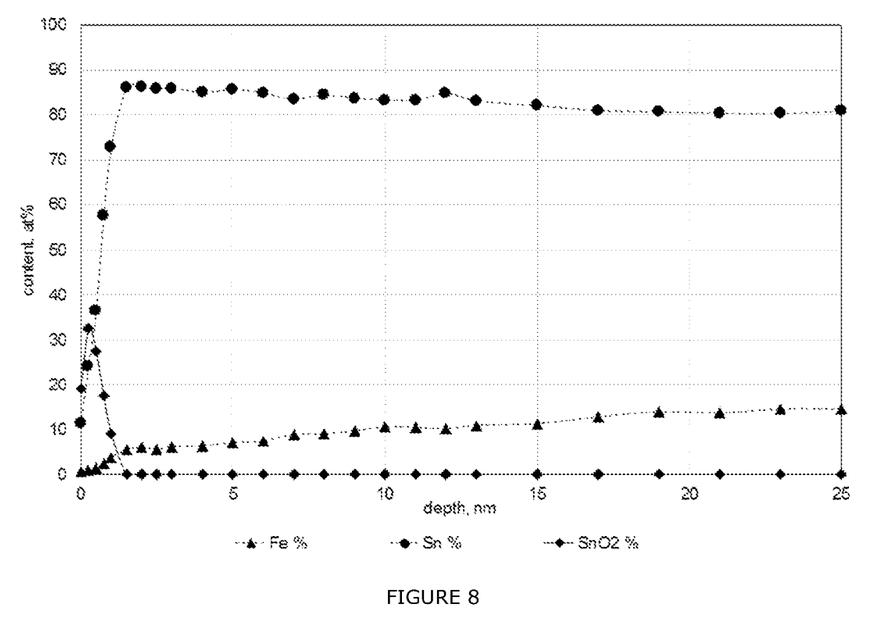

Analysis of the delamination interface by XPS reveals that the poor adhesion in the Comparative Example 14 can be attributed to the presence of tin oxide species, mainly $SnO_2$, at the interface between polymer and tin layer. FIGS. 4 and 5 show the XPS depth profiles of the tinplate substrate and the peeled-off polymer coating, respectively, for material from Example 4, representing the state-of-the-art chromium-passivated tinplate. On both the substrate side and the delaminated polymer side, the depth profile shows predominantly organic carbon. This means that delamination of the polymer coating occurs through cohesive failure within the polymer itself, at some distance (several tens of nanometres) away from the tin surface. This implies that the adhesion between the polymer and the tin surface is very strong. FIGS. 6 and 7 show the XPS depth profiles of the tinplate substrate and the peeled-off polymer coating, respectively, for material from Inventive Example 8, representing chromium-free passivated tinplate, involving the steps of cleaning in sodium carbonate solution without applying a current and subsequently applying a Bonderite M-NT1456 solution. On the substrate side, the depth profile shows predominantly tin with a very thin layer (about 1 nm) of tin oxide, mainly SnO. This thin SnO layer may have been formed in the sample preparation process after separation of the polymer coating. On the peeled-off coating side, predominately organic carbon is observed. This result indicates that delamination takes place on a well-defined interface between the organic coating layer (i.e. the organic portion of the Bonderite layer and/or the polymer coating layer) and tin, providing a strong bond between coating and substrate as reflected in a high T-peel adhesion force and good adhesion performance in the cross-cut test. Finally, FIGS. 8 and 9 show the XPS depth profiles of the tinplate substrate and the peeled-off polymer coating, respectively, for material from Comparative Example 14, representing chromium-free passivated tinplate, involving the steps of cleaning in sodium carbonate solution while applying an anodic current and subsequently applying a Bonderite M-NT1456 solution. The depth profiles on both the substrate side and the polymer side show significant amounts of tin oxide, mainly $SnO_2$, of several nanometres in thickness. The fact that tin oxide is clearly present of both sides of the delamination interface means that delamination occurs within the oxide layer. From the T-peel adhesion values it is evident that this oxide layer is weak and leads to easy delamination of the polymer coating from the tinplate surface. Thus, the presence of such an oxide layer must be avoided in order to achieve a good adhesion between the polymer coating and the tinplate substrate.

TABLE 1

Properties of tinplate substrate, passivation type and polymer coating in the Examples of the present invention (soda = sodium carbonate)

| Example | Tin weight (g/m2) | Flow melting | Passivation Step 1 | Passivation Step 2 | Polymer coating |
|---|---|---|---|---|---|
| 1 | 2.0 | Yes | None | 311 | A |
| 2 | 2.8 | Yes | None | 311 | A |
| 3 | 2.0 | Yes | None | 311 | B |
| 4 | 2.8 | Yes | None | 311 | B |
| 5 | 1.0 | Yes | None | 311 | B |
| 6 | 5.6 | Yes | None | 311 | B |
| 7 | 2.0 | No | Soda, no current | Bonderite | B |
| 8 | 2.8 | No | Soda, no current | Bonderite | B |
| 9 | 2.0 | Yes | Soda, no current | Bonderite | B |
| 10 | 2.8 | Yes | Soda, no current | Bonderite | B |
| 11 | 2.0 | Yes | Soda, no current | None | B |
| 12 | 2.8 | Yes | Soda, no current | None | B |
| 13 | 2.0 | Yes | Soda, anodic current | Bonderite | B |
| 14 | 2.8 | Yes | Soda, anodic current | Bonderite | B |

TABLE 2

Product evaluation tests

| Test | Description | Medium | Conditions |
|---|---|---|---|
| Test 1 | Dry adhesion | n/a | n/a |
| Test 2 | Bouillon Plasmal | 12 g/l Maggi + 2 g/l Plasmal | 121° C./90 min |
| Test 3 | Acetic Acid | 1% Acetic Acid | 121° C./60 min |
| Test 4 | Saline Test | 3.6% NaCl | 121° C./90 min |
| Test 5 | Vitamin C | 1 g/l Vitamin C + 3.6% NaCl | 121° C./90 min |
| Test 6 | Water | Demineralized water | 121° C./60 min |
| Test 7 | Salt-Acid | 18.7 g/l NaCl + 30 g/l acetic acid | 121° C./60 min |

As part of the inventors extensive investigations into the surface treatments of tinplate in relation to tin oxide formation and stability, and with respect to adhesion of organic and polymer coatings, the inventors have studied the performance of broadly two types of chromium-free passivation treatment solutions: those based on siloxanes and those based on zirconium and titanium compounds. A well-known example of a siloxane-based treatment system is Oxsilan® MM0705 from Chemetall. A well-known example of a zirconium/titanium-based treatment system is Bonderite™ M-NT1456 from Henkel. Both systems were applied to tinplate having a tin coating weight of 2.8 g/m² Sn on both sides using a spray application installed at a commercial production line. The application conditions and chromium-free passivation treatment solution composition was chosen to give a treatment layer thickness of 0.6-0.8 mg/m² Si or Ti, afterwards confirmed by surface characterisation (XPS). Tin oxide and tin oxide growth rate was then determined and compared to chromium passivated ('311') tinplate and non-passivated tinplate.

The amount of tin oxide present on the surface of the material can be determined using a coulometric method. The tin oxide layer is reduced by a controlled small cathodic current in a 0.01M solution of hydrobromic acid (HBr) that is freed from oxygen by scrubbing with nitrogen. The progress of the reduction of the oxide is monitored by measuring the reduction potential, and the charge passed (A*t) for the complete reduction serves as a measure of the tin oxide layer thickness. For the test, a cylindrical cell is used having a circular aperture of ca. 4 cm diameter on one end and an Ag/AgCl reference electrode. The other end of the cell contains a platinum counter electrode. The test specimen covers the aperture, which is sealed using an O-ring to make a water-tight connection of a well-defined area, and is tightened into place using an air-pressure cylinder. The cell is connected to the electrolyte solution by a flexible tube so that it can be filled and emptied under nitrogen atmosphere. A cathodic current density of $-0.50$ $A/m^2$ is applied to the sample using a potentiostat-galvanostat, and the potential is measured until the reduction is complete. The result of the test is expressed as the total charge density (in $C/m^2$) needed to reduce the oxide layer. The stability of the oxide layer is examined by placing a test panel in a climate chamber at 40° C. and 80% relative humidity for two weeks, and then measuring the amount of tin oxide present on the surface and comparing to the amount of tin oxide present on the surface in the as-received tinplate material.

The results of this investigation are summarised in Table 3. The Zr/Ti-based Bonderite system provides thinner and more stable tin oxide layers on the tinplate surface compared to the Si-based Oxsilan system. Based on this result it is evident that the Zr/Ti-based system is ideally suited in terms of the present invention while the Si-based system is not.

TABLE 3

Comparison of tin-oxide layer stability after passivation

| Treatment system | Tin oxide value (C/m2) | | |
|---|---|---|---|
| | As-received | After humid test** | Difference |
| 311 passivation | 13 | 13 | 0 |
| Bonderite M-NT1456 | 16 | 22 | 6 |
| Oxsilan MM0705 | 35 | 86 | 51 |
| Non-passivated | 32 | 99 | 67 |

**Exposed during two weeks at 40° C. and 80% RH in a climate chamber

TABLE 4

Adhesion values from cross-cut test on flat panels, dry and after sterilisation in various media, in triplo

| | Example | | | | | | |
|---|---|---|---|---|---|---|---|
| | 1* | 2* | 3* | 4* | 5* | 6* | 7 |
| Tin weight (g/m²) | 2.0 | 2.8 | 2.0 | 2.8 | 1.0 | 5.6 | 2.0 |
| Flow melted? | Yes | Yes | Yes | Yes | Yes | Yes | No |
| Passivation Step 1 | None | None | None | None | None | None | Soda No current |
| Passivation Step 2 | 311 | 311 | 311 | 311 | 311 | 311 | Bonderite |
| Coating Type | A | A | B | B | B | B | B |
| Dry adhesion by T-peel adhesion force (N/15 mm) | 8.6 | 10.9 | 6.6 | 8.3 | 6.8 | 8.5 | 8.0 |
| Test 1. Dry adhesion | 1 1 1 | 1 1 1 | 1 1 1 | 1 1 1 | 1 1 1 | 1 1 1 | 0 1 1 |
| Test 2. Bouillon Plasmal | 1 1 1 | 1 1 1 | 1 1 1 | 1 1 1 | 1 1 1 | 1 1 1 | 1 2 1 |
| Test 3. Acetic Acid | 1 1 1 | 1 1 1 | 1 1 1 | 1 1 1 | 1 1 1 | 1 1 1 | 2 2 2 |
| Test 4. Saline Test | 1 1 1 | 1 1 1 | 1 1 1 | 1 1 1 | 1 1 1 | 1 1 1 | 1 2 2 |
| Test 5. Vitamin C | 1 1 1 | 1 1 1 | 1 1 1 | 1 1 1 | 1 1 0 | 1 1 1 | 2 2 1 |
| Test 6. Water | 1 1 1 | 1 1 1 | 0 0 1 | 1 1 1 | 1 1 1 | 1 1 1 | 1 1 2 |
| Test 7. Salt-Acid | 1 1 1 | 1 1 1 | 1 1 1 | 1 1 1 | 1 0 1 | 1 1 1 | 1 2 1 |

| | Example | | | | | | |
|---|---|---|---|---|---|---|---|
| | 8 | 9 | 10 | 11 | 12 | 13* | 14* |
| Tin weight (g/m²) | 2.8 | 2.0 | 2.8 | 2.0 | 2.8 | 2.0 | 2.8 |
| Flow melted? | No | Yes | Yes | Yes | Yes | Yes | Yes |
| Passivation Step 1 | Soda No current | Soda No current | Soda No current | Soda No current | Soda No current | Soda Anodic current | Soda Anodic current |
| Passivation Step 2 | Bonderite | Bonderite | Bonderite | Bonderite | Bonderite | Bonderite | Bonderite |
| Coating Type | B | B | B | B | B | B | B |
| Dry adhesion by T-peel adhesion force (N/15 mm) | 8.7 | 7.0 | 7.5 | 7.2 | 7.8 | 2.0 | <0.5 |
| Test 1. Dry adhesion | 1 1 1 | 2 1 1 | 2 1 1 | 1 1 1 | 1 1 1 | 2 3 2 | 2 3 3 |
| Test 2. Bouillon Plasmal | 0 1 0 | 1 1 2 | 0 1 0 | 2 1 2 | 0 1 1 | 3 3 3 | 3 3 3 |
| Test 3. Acetic Acid | 2 2 2 | 2 2 2 | 2 2 2 | 2 2 1 | 2 2 2 | 5 5 5 | 5 5 5 |
| Test 4. Saline Test | 1 1 2 | 1 2 2 | 1 2 2 | 1 0 1 | 1 0 0 | 2 2 2 | 2 2 2 |
| Test 5. Vitamin C | 1 1 1 | 1 1 1 | 1 2 1 | 1 1 0 | 0 1 1 | 2 3 3 | 2 3 3 |
| Test 6. Water | 1 1 2 | 1 2 2 | 1 2 2 | 1 1 2 | 1 1 0 | 2 2 3 | 2 2 2 |
| Test 7. Salt-Acid | 1 1 2 | 1 1 2 | 1 2 2 | 1 1 1 | 2 1 1 | 4 4 3 | 4 4 4 |

*comparative examples

Figure 1:
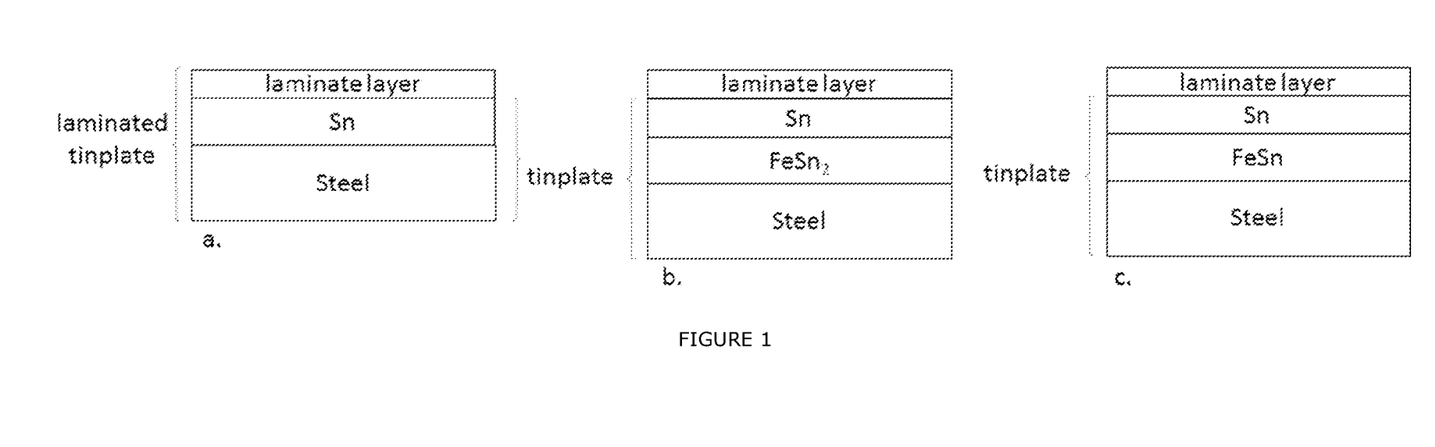
FIG. 1 shows the definition of some terms.
Figure 2:
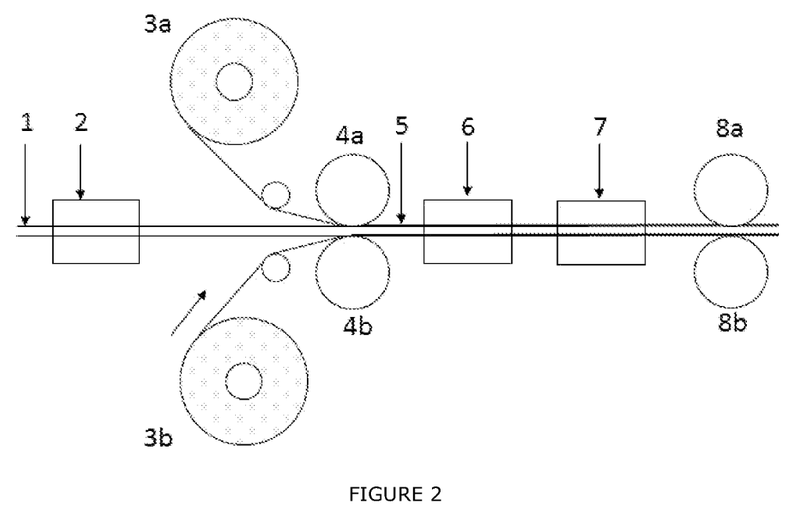
FIG. 2 shows a schematic depiction of the solid film lamination process.

In FIG. 2 the tinplate sheet or strip (1) is passed through first heating device (2) where temperature of the tinplate is raised to pre-heat temperature suitable for lamination, T1. Two coils of laminate layer (3a, 3b) are simultaneously unwound and passed, together with the pre-heated tinplate, through a roll-nip assembly comprising a pair of laminating rollers (4a, 4b). The laminated tinplate (5) is passed through a second heating device (6) where the temperature of the laminated tinplate is raised to a post-heat set-point, T2. After the second heating device, the laminated tinplate is immediately cooled by passing through a quenching device (7) to reach room temperature. The method of pre-heating the tinplate in the first heating device is not particularly limited and may include passing the strip over heated rolls, conductive heating, inductive heating, radiative heating, etc. The method of post-heating the laminated tinplate in the second heating device is preferably a contactless method, such as heating in a hot gas environment or inductive heating. The method of immediate cooling in the quenching device is not particularly limited and may include applying cold air or passing through a cold water bath etc. In FIG. 2 the laminate layers are provided on a coil. However, the laminate layers may also be provided directly from the extrusion die after having been stretched and cooled to a solid and stretched thermoplastic laminate layer.

Figure 3:
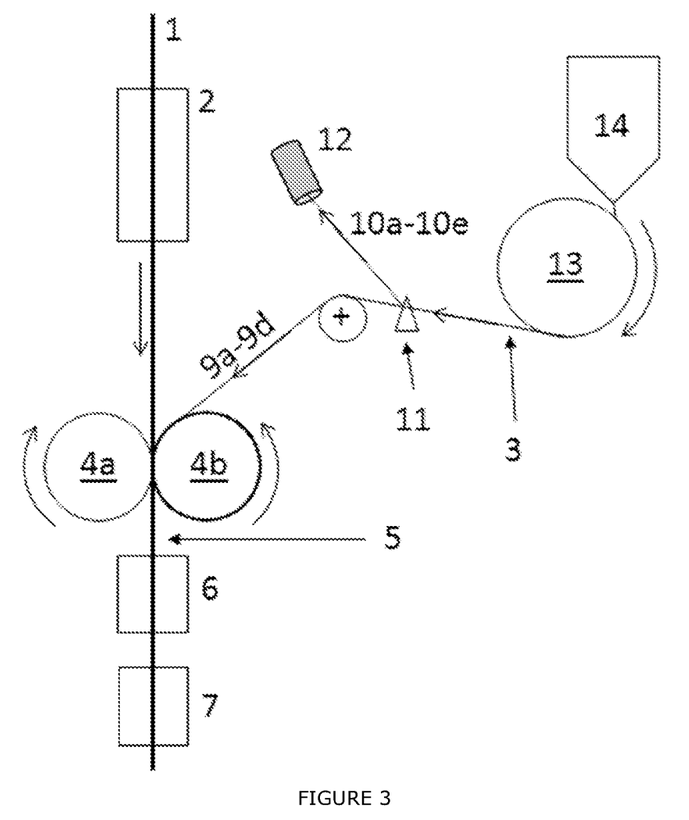
FIG. 3 shows a schematic depiction of the cast film lamination process.

In FIG. 3 the laminate layer is extruded from a flat die (14), drawn down in a narrow gap formed between the extrusion die and the cast roll, and cast at its final desired thickness on the cast roll (13) where it is rapidly cooled. Since the draw down to the final thickness takes place in the liquid condition, the cast laminate layer is essentially non-oriented. The laminate layer can then be laminated onto the tinplate 1 in a similar way to the process depicted in FIG. 2.

To produce material for 3-piece cans the extruded laminated layer is slit (11) and the narrow polymer strips (10a-10d) in between the wide laminate layers (9a-9d) are led away and removed. The number of wide laminate layers (9a-9d) produced from the extruded polymer film can be 2 or more. In the explanatory figures a number of four wide laminate layers (9a-9d) is used by means of example, but the invention works just as well with two, three or more wide polymer films. The number of narrow polymer strips (10) cut out from between the wide laminate layers (9a-9d) to be discharged is in principle always 1 lower than the number of wide laminate layers to be laminated onto the tinplate. The width of the extruded laminate layer (3) should be smaller than that of the tinplate to allow the edges of the tinplate to remain uncoated. If the polymer film becomes too wide for the edges of the tinplate to remain uncoated (i.e. bare) then an in-line trimming of the edges of the polymer film may be needed. These cut-off edges are led away from the laminate layer and the laminate layer is coated onto the tinplate in the lamination process leaving the outermost edges of the tinplate bare from polymer. This is preferable over the alternative namely to coat the edges and grind off or otherwise remove the edges of the polymer coating after the lamination process. The leading away of the cut-off edges of the polymer film can be done by a cutting waste extraction device means such as by a sucking device (12).

Figure 10:
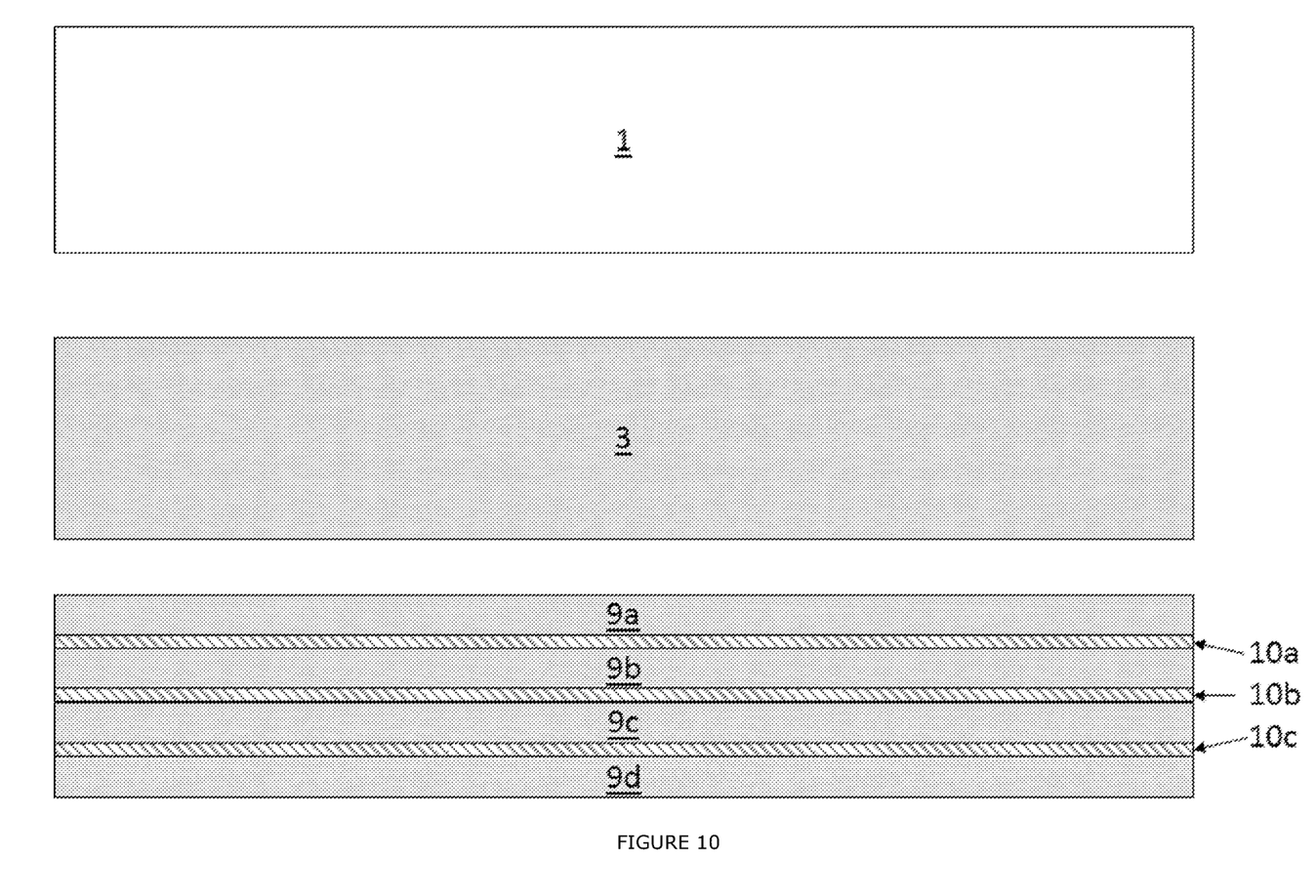
FIGS. 10 to 12 show the production stages of laminated tinplate for 3-piece cans.
Figure 11:
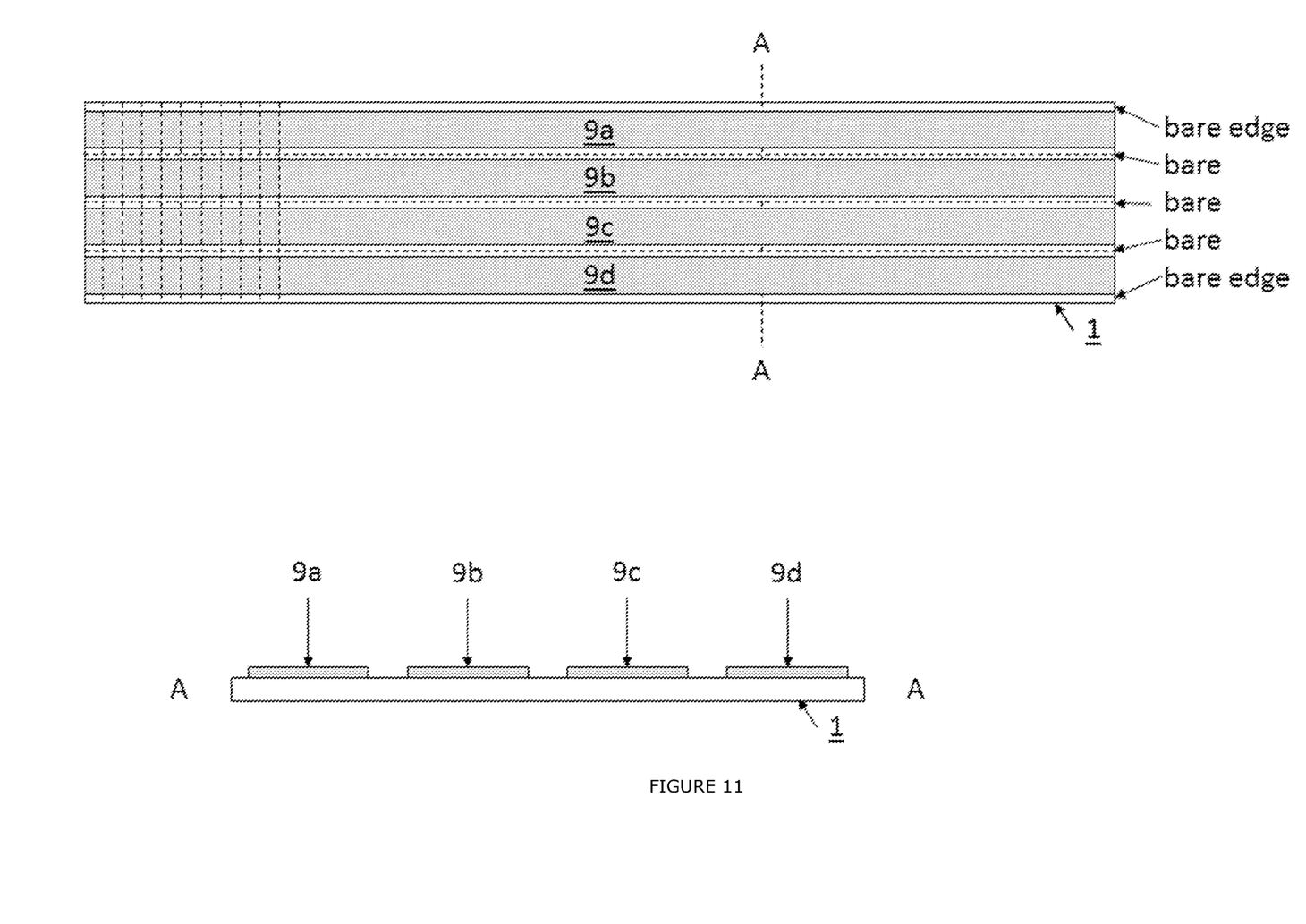

FIG. 10 shows the tinplate 1 in a top view (not to scale) as well as the extruded and cooled laminate layer 3. The slit situation is depicted in the bottom drawing of FIG. 10 where the small strips to be removed are hatched (10a-10c) and the wide laminate layers to be laminated onto the tinplate with 9a-9d. FIG. 11 shows a top view of the laminated tinplate, where the bare strips and bare edges are shown. These bare edges and bare strips are needed for forming three-piece can bodies which are welded together. FIG. 11 also shows schematically (top drawing left hand side, dashed lines) how the laminated tinplate could be slit lengthwise into four narrow laminated tinplate strips, and also how individual blanks for 3-piece cans could be produced. Each of these blanks have edges which are free from polymer, and are thus weldable to produce a 3-piece can body (see FIG. 13).

Figure 12:
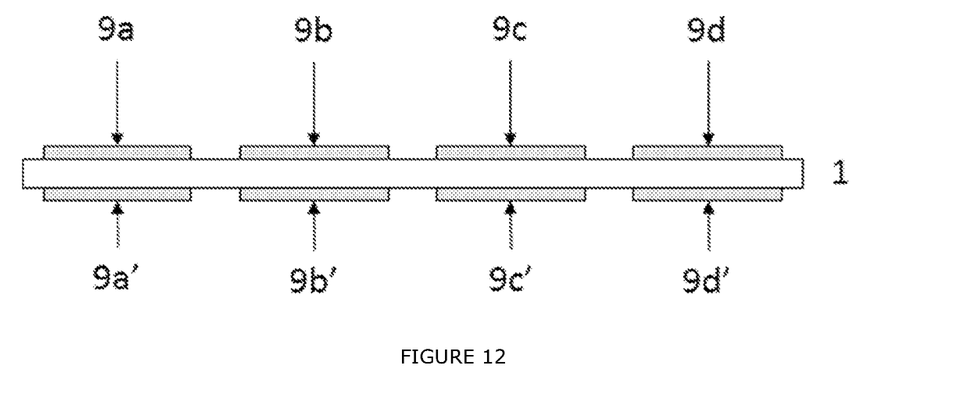
Figure 13:
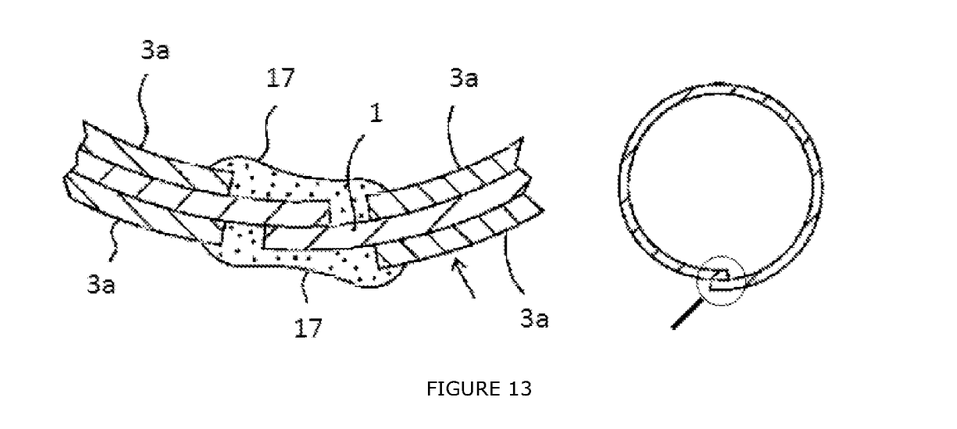

The bottom picture in FIG. 11 shows a cross section along A-A. FIG. 12 shows the same where laminate layers are provided on both sides of the tinplate. FIG. 13 shows a cross-section of a welded 3-piece can body and the left hand side of the figure shows an enlarged portion of the welded portion. The bare tinplate edges are clearly shown as well as the edges of the wide polymer film strip 3a and the portion where the two bare edges are bonded together by welding. The welded and bare metal is subsequently covered with a lacquer 17 to protect the metal against corrosion. The lacquer is preferably BPA-free.

The invention claimed is:

1. A method for manufacturing a laminated tinplate for packaging applications, the laminated tinplate comprising a tinplate sheet and a thermoplastic laminate layer that covers at least one side of the tinplate sheet,
   the laminate layer consisting of a plurality of layers,
   wherein each layer contains a polymer selected from thermoplastic aromatic (co-)polyester or a blend thereof or a polyolefine comprising at least 90% by mole of a propylene unit,
   the method comprising the subsequent steps of:
      producing the tinplate sheet by electrolytically tinning a cold-rolled steel sheet to add a tin layer on one or both sides of the cold-rolled steel sheet by electroplating;
      then subjecting the tinplate sheet to a surface treatment by dipping the tinplate sheet in an aqueous solution having a pH of from 8 to 12, without imposing a cathodic current onto the tinplate sheet while being dipped and without imposing an anodic current onto the tinplate while being dipped, wherein the aqueous solution has an absence of citrate ions and acetate ions;
      rinsing and drying the tinplate sheet;
      optionally applying a chromium-free, no-rinse, dry-in-place passivation treatment solution to the tinplate sheet and drying the passivated tinplate sheet;
      providing the thermoplastic laminate layer for coating onto the at least one side of the tinplate sheet;
      pre-heating the tinplate sheet and laminating the thermoplastic laminate layer onto the pre-heated tinplate sheet to produce the laminated tinplate; and
      post-heating the laminated tinplate to a temperature sufficiently high to melt the laminate layer; and cooling the post-heated laminated tinplate;
   wherein the aqueous solution having the pH of from 8 to 12 consists of:
   water,
   at least one anion selected from the group consisting of phosphate, borate, sulphate and carbonate ions,
   at least one cation selected from the group consisting of Periodic Table Group 1 cations and Periodic Table Group 2 cations, and
   optionally at least one additive selected from the group consisting of surfactants, wetting agents, and antifoaming agents.

2. The method of claim 1,
   wherein the aqueous solution is a sodium carbonate solution having a pH of 9.5-10.0; and
   the chromium-free, no-rinse, dry-in-place passivation treatment solution is applied to the tinplate sheet and the passivated tinplate sheet is dried, wherein the passivation treatment solution is based on zirconium, titanium, phosphates, or a combination of zirconium and titanium, wherein the passivation treatment solution is silane free, siloxane free and not Si-based.

3. The method of claim 1, wherein the aqueous solution has a pH of 8-10.0.

4. The method according to claim 1, wherein the subjecting of the tinplate sheet to the surface treatment removes any contaminants and tin oxides is by dipping the tinplate sheet in the aqueous solution, wherein the pH of the aqueous solution is from 8 to 10.5.

5. The method according to claim 1, wherein the aqueous solution for the surface treatment contains as anions only the at least one anion selected from the group consisting of borate ions, sulphate ions, and carbonate ions and there is an absence of phosphate anion in the aqueous solution.

6. The method according to claim 1, wherein the chromium-free, no-rinse, dry-in-place passivation treatment solution is a zirconium phosphate and/or titanium phosphate-based passivation treatment solution and is applied to the tinplate sheet and drying the passivated tinplate sheet.

7. The method according to claim 1, wherein the aqueous solution for the surface treatment contains as the anions the carbonate ions, wherein the aqueous solution has an absence of surfactant, and wherein the aqueous solution has an absence of wetting agent.

\* \* \* \* \*